United States Patent
Sinha et al.

(10) Patent No.: US 7,509,622 B2
(45) Date of Patent: Mar. 24, 2009

(54) DUMMY FILLING TECHNIQUE FOR IMPROVED PLANARIZATION OF CHIP SURFACE TOPOGRAPHY

(75) Inventors: Subarnarekha Sinha, Menlo Park, CA (US); Jianfeng Luo, Fremont, CA (US); Charles C. Chiang, San Jose, CA (US)

(73) Assignee: Synopsys, Inc., Mountain View, CA (US)

( * ) Notice: Subject to any disclaimer, the term of this patent is extended or adjusted under 35 U.S.C. 154(b) by 191 days.

(21) Appl. No.: 11/379,043

(22) Filed: Apr. 17, 2006

(65) Prior Publication Data

US 2007/0245284 A1    Oct. 18, 2007

(51) Int. Cl.
*G06F 17/50* (2006.01)
*G06F 19/00* (2006.01)

(52) U.S. Cl. .............. 716/21; 716/8; 700/119; 700/120; 700/121

(58) Field of Classification Search ............ 716/21, 716/8; 700/119, 120, 121
See application file for complete search history.

(56) References Cited

U.S. PATENT DOCUMENTS

| | | | | |
|---|---|---|---|---|
| 5,182,055 A * | 1/1993 | Allison et al. | | 264/401 |
| 5,256,340 A * | 10/1993 | Allison et al. | | 264/401 |
| 5,609,813 A * | 3/1997 | Allison et al. | | 264/401 |
| 5,711,911 A * | 1/1998 | Hull | | 264/401 |
| 5,965,079 A * | 10/1999 | Manners | | 264/401 |
| 6,036,911 A * | 3/2000 | Allison et al. | | 264/401 |
| 6,261,507 B1 * | 7/2001 | Gigl et al. | | 264/401 |
| 6,264,873 B1 * | 7/2001 | Gigl et al. | | 264/401 |
| 7,289,933 B2 * | 10/2007 | Luo et al. | | 702/167 |
| 2001/0028077 A1 * | 10/2001 | Nakamura et al. | | 257/303 |
| 2002/0097367 A1 * | 7/2002 | Hirabayashi | | 349/149 |
| 2004/0058255 A1 | 3/2004 | Jessen et al. | | |
| 2005/0146714 A1 | 7/2005 | Kitamura et al. | | |
| 2007/0118320 A1 * | 5/2007 | Luo et al. | | 702/117 |

OTHER PUBLICATIONS

Luo et al., "A Layout Dependent Full-Chip Copper Electroplating Topography Model", IEEE/ACM International Conference on Computer-Aided Design, Nov. 6-10, 2005, pp. 133-140.*

(Continued)

*Primary Examiner*—Phallaka Kik
(74) *Attorney, Agent, or Firm*—Bever, Hoffman & Harms, LLP; Jeanette S. Harms (57) ABSTRACT

The use of smooth post-ECP topography (instead of final chip topography) as an objective during dummy filling enables a computationally efficient model-based dummy filling solution for copper while maintaining solution quality. A layout can be divided into tiles and the "case" of each tile identified. Exemplary cases can include conformal fill, over fill, super fill, or super/over fill (if the ECP model cannot distinguish between super and over fill cases). One or more undesired tile cases can be converted to a desired tile case. Then, a height difference between tiles can be minimized. Dummy features can be inserted in the layout to perform the conversion and to minimize the height difference between tiles. Minimizing the CMP-effective density difference between tiles with ECP considerations can be performed to further improve planarization.

29 Claims, 8 Drawing Sheets

OTHER PUBLICATIONS

Fu et al., "An Analytical Dishing and Step Height Reduction Model for Chemical Mechanical Planarization (CMP)", IEEE Transactions on Semiconductor Manufacturing, vol. 16, No. 3, Aug. 2003, pp. 477-485.*

He et al., "Design of Integrated-Circuit Interconnects with Accurate Modeling of Chemical-Mechanical Planarization", Design and Process Integration for Microelectronic Manufacturing III, ed. Lars W. Liebmann, Proceedings of the SPIE, vol. 5756, 2005, 11 pages.

IM et al., "Modeling Pattern Density Dependent Bump Formation in Copper Electrochemical Deposition", Electrochemical and Solid-State Letters, vol. 6, No. 3, 2003, pp. C42-C46.

Josell et al., "A Simple Equation for Predicting Superconformal Electrodeposition in Submicrometer Trenches", Journal of The Electrochemical Society, vol. 148, No. 12, 2001, pp. C767-C773.

Luo et al., A Layout Dependent Full-Chip Copper Electroplating Topography Model, IEEE/ACM International Conference on Computer-Aided Design, Nov. 6-10, 2005, pp. 133-140.

Luo et al., "Review of Chemical-Mechanical Planarization Modeling for Integrated Circuit Fabrication: From Particle Scale to Die and Wafer Scales" (Jun. 1, 2003). Laboratory for Manufacturing and Sustainability. Precision Manufacturing Group. Paper 2002_luo_1. http://repositories.cdlib.org/lma/pmg/2002_luo_1 31 pages.

Luo et al., "Wafer-Scale CMP Modeling of With-in Wafer Non-Uniformity" (Jun. 1, 2003). Laboratory for Manufacturing and Sustainability. Precision Manufacturing Group. Paper 2002_luo_2. http://repositories.cdlib.org/lma/pmg/2002_luo_2 24 pages.

Mehrotra, Vikas, "Modeling the Effects of Systematic Process Variation on Circuit Performance", Ph. D. Dissertation, Dept. of EECS, MIT, Cambridge, MA, USA, 2001, pp. 1-156.

Moffat et al., "Superconformal Electrodeposition of Copper", Electrochemical and Solid-State Letters, vol. 4, No. 4, 2001, pp. C26-C29.

Ouma et al., "Characterization and Modeling of Oxide Chemical-Mechanical Polishing Using Planarization Length and Pattern Density Concepts", IEEE Transactions On Semiconductor Manufacturing, vol. 15, No. 2, May 2002, pp. 232-244.

Ouma et al., "Modeling of Chemical Mechanical Polishing for Dielectric Planarization", Ph. D. Dissertation, Dept. of EECS, MIT, Cambridge, MA, USA, Nov. 1998, pp. 1-228.

Park et al., "Characterization and Modeling of Pattern Dependencies in Copper Interconnects for Integrated Circuits", Ph. D. Dissertation, Dept. of EECS, MIT, Cambridge, MA, USA, May 2002, pp. 1-204.

Reid et al., "Factors influencing damascene feature fill using copper PVD and electroplating", Solid State Technology online, Jul. 2000, 10 pages.

Stavreva et al., "Chemical-mechanical polishing of copper for interconnect formation", Microelectronic Engineering, vol. 33, 1997, pp. 249-257.

Tugbawa, Tamba E. Gbondo, "Chip-Scale Modeling of Pattern Dependencies in Copper Chemical Mechanical Polishing Processes", Ph. D. Dissertation, Dept. of EECS, MIT, Cambridge, MA, USA, May 2002, pp. 1-228.

Tugbawa et al., "Modeling of Pattern Dependencies in Multi-Step Copper Chemical Mechanical Polishing Processes", Chemical-Mechanical Planarization for Multilevel Interconnect, Santa Clara, CA, Mar. 2001, 4 pages.

Vereecken et al., "The chemistry of additives in damascene copper plating", IBM J. Res. & Dev., vol. 49, No. 1, Jan. 2005, pp. 3-18.

Wolf, Stanley, "Silicon Processing for the VLSI Era", vol. 4: Deep Submicron Process Technology, Lattice Press, Sunset Beach, CA, 2002, pp. 312-429 and 710-789.

Yang et al., "Sub-100nm interconnects using multistep plating", Solid State Technology, Oct. 2003, 4 pages.

* cited by examiner

DUMMY FILLING TECHNIQUE FOR IMPROVED PLANARIZATION OF CHIP SURFACE TOPOGRAPHY

BACKGROUND OF THE INVENTION

1. Field of the Invention

The invention relates to a dummy filling methodology that can improve planarization of chip surface topography.

2. Description of the Related Art

A typical wafer for an integrated circuit (IC) includes multiple layers formed on a substrate. These layers, each layer having a predetermined pattern thereon, can result in an uneven topography on the wafer surface. An uneven topography on one layer can have adverse effects on one or more subsequent layers.

Figure 1A:
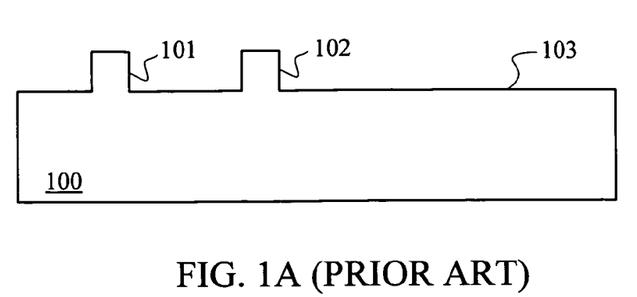
FIG. 1A illustrates a cross-section of an etched layer on a wafer.
Figure 1B:
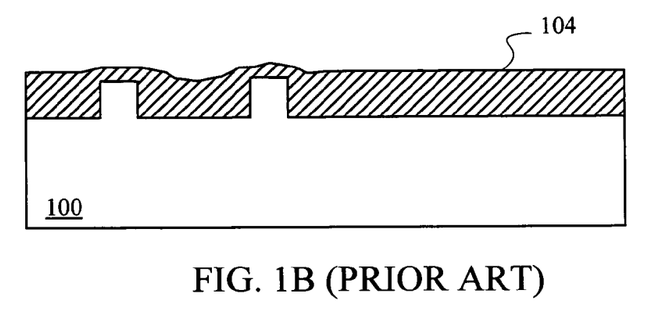
FIG. 1B illustrates a resulting uneven surface if another layer is formed on the etched layer of FIG. 1A.

For example, FIG. 1A illustrates a cross-section of an etched aluminum layer 100 on a wafer, wherein etched aluminum layer 100 includes two features 101 and 102. Both features 101 and 102 extend above a level 103 as protrusions. If another layer 104 is formed on etched aluminum layer 100, as shown in FIG. 1B, layer 104 can also have an uneven surface due to the uneven topography of layer 100. The uneven surface of layer 104 can undesirably complicate lithographic processing on this layer because of light reflection or inadequate coverage over the "steps" in layer 100.

A common technique used to counter the effects of an uneven topography is planarization. The goal of planarization is to ensure that subsequent lithographic results are independent from or, more realistically, much less dependent on the underlying wafer topography from previous layers. Planarization is especially important for layers requiring critical dimension control. Specifically, an uneven topography could pose significant depth of focus problems, thereby rendering CD control across the wafer virtually impossible.

Figure 1C:
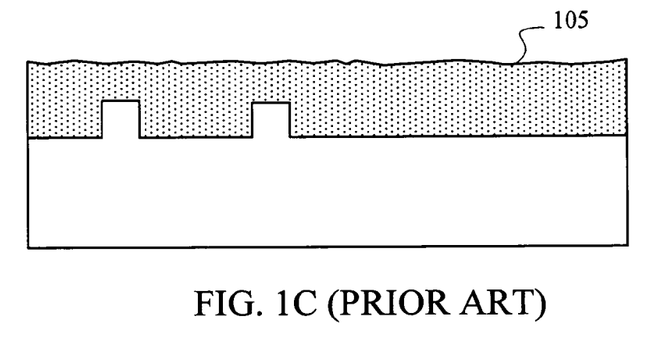
FIG. 1C illustrates a known planarization technique in which a thick spin-on-glass (SOG) layer can be deposited on the etched layer of FIG. 1A and then baked to form silicon dioxide. As shown, the resulting surface still retains irregularities that can influence a subsequent lithographic process.

However, planarization itself can cause problems on the wafer. For example, in one known planarization process shown in FIG. 1C, a thick spin-on-glass (SOG) layer 105 can be formed on etched aluminum layer 100. After formation, SOG layer 105 is baked, thereby leaving substantially planarized silicon dioxide. The resulting surface, although significantly more even than layer 104, still retains irregularities that can influence a subsequent lithographic process. For this reason, a chemical-mechanical polish (CMP) can be used to polish SOG layer 105.

Figure 1D:
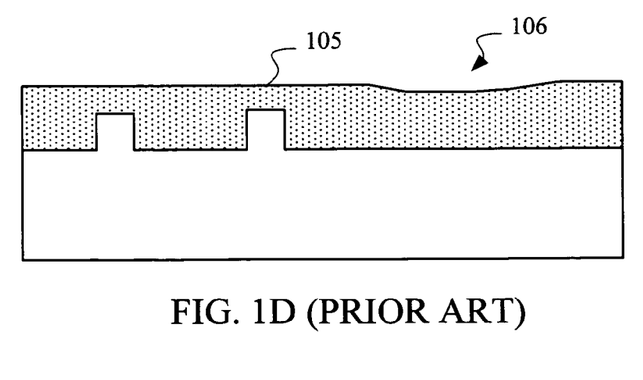
FIG. 1D illustrates a resulting uneven surface after a chemical-mechanical polish (CMP) of an SOG layer.

In a CMP process, a device mechanically polishes the surface of the wafer. Unfortunately, because of the underlying features in layer 100, such as features 101 and 102, the polishing of layer 105 can result in an uneven force being applied to certain areas of the surface of the wafer. In turn, this uneven force can cause some areas to polish faster than other areas, thereby resulting in an uneven polished surface. FIG. 1D illustrates a recessed area 106 that could result from a CMP of layer 105.

Figure 2:
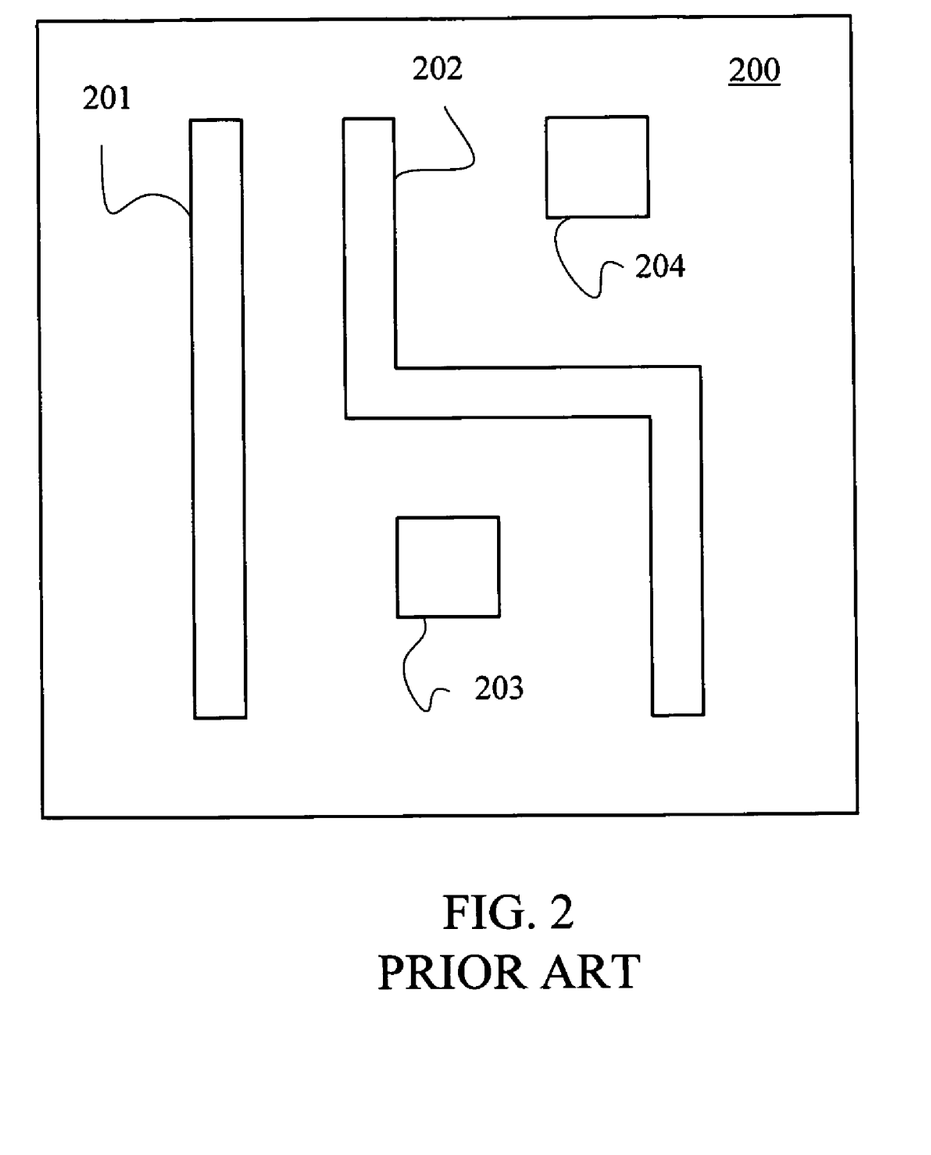
FIG. 2 illustrates a top-level view of a layer including two main features and two dummy features that provide mechanical support during a CMP.

To reduce systematic topography variations, electrically inactive features, called "dummy" features, have been placed on regions of the wafer to provide mechanical support during a CMP. For example, FIG. 2 illustrates a top-level view of a layer 200 including two main features 201 and 202 and dummy features 203 and 204. The process of introducing these dummy features is often referred to as "dummy filling".

The primary objective of conventional dummy filling is to reduce the density difference between the different regions in the layout. Notably, when aluminum was used as the interconnect material, the primary source of chip topography variations was due to non-uniformities after the inter-layer dielectric (ILD) CMP process. Such topography variations after ILD CMP are primarily due to the inherent density differences between the different regions of the layout as oxide deposition was conformal and the final thickness after CMP depended on the underlying density of the location. Hence, for fabrication using aluminum, dummy filling based solely on density was effective in reducing topography variations.

The advent of copper interconnect in sub-130 nm integrated circuits has introduced additional complexity in forming a planar topography. Specifically, during the copper metallization process, trenches for wires and holes for vias are etched in a dielectric material. After etching, electroplating (ECP) is performed to fill up the trenches/holes with copper and then CMP is performed to remove excess copper from the dielectric surface, thereby leaving copper in the trenches/holes as interconnect wires/vias.

Figure 3:
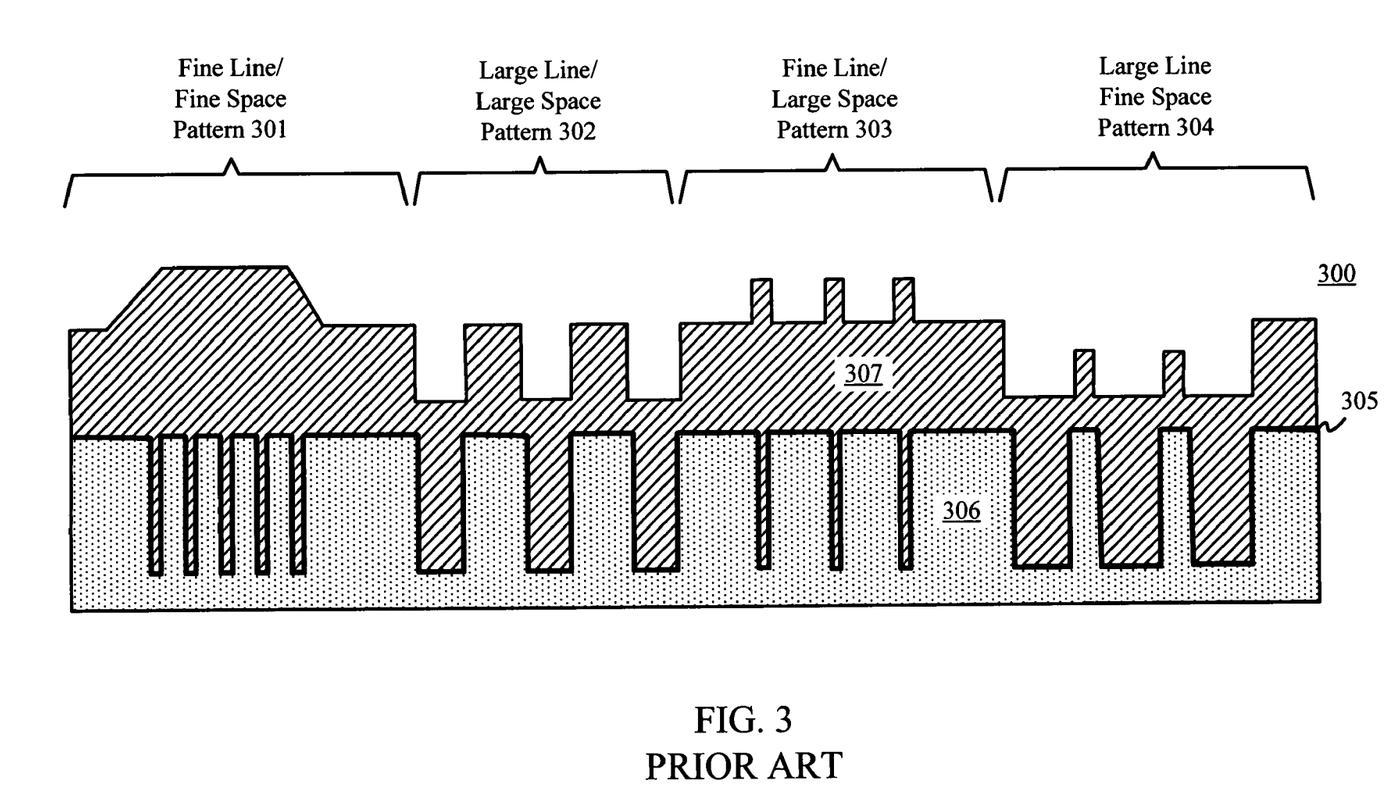
FIG. 3 illustrates resulting various topographies of a copper layer deposited on an etched oxide layer having different line/space patterns.

FIG. 3 illustrates a cross section of a set of topographies 300 after ECP based on various underlying trench patterns. Notably, topographies 300 can vary dramatically based on the underlying line/space pattern. Exemplary patterns include fine line/fine space pattern 301, large line/large space pattern 302, fine line/large space pattern 303, and large line/fine space pattern 304.

Variations in post-ECP topography are typically propagated through CMP, thereby adversely affecting final chip topography. Specifically, a barrier metal layer 305 (e.g. $Ta_2N_3$) is typically formed between the underlying etched oxide layer 306 and the copper layer 307. During CMP, barrier metal layer 305 is polished more slowly than copper layer 307. Notably, the uppermost horizontal sections of barrier metal layer 305 must be removed during CMP to prevent shorting. Therefore, some of the copper lines may have sole loss of planarity to ensure complete barrier metal removal. As a result, a topography variation after ECP can be propagated to the chip topography after CMP, even though the CMP reduces the ECP non-uniformity.

In general, a variety of layout parameters besides density can affect the topography during copper processing. For example, referring to topologies 300 of FIG. 3, fine line/fine space pattern 301 and large line/large space pattern 302 have the same density. Therefore, the resulting topologies of these areas should be the same. However, as shown in FIG. 3, these two areas actually end up with very different topographies.

Variations in final chip topography can cause functional and parametric yield problems, e.g. focus issues in lithography as well as sheet resistance and parasitic capacitance variations in the timing. To further complicate matters, the depth of focus (DOF) budget and interconnect thickness values are continually shrinking with each technology node. Therefore, reducing the systematic topography variations during the fabrication process is of paramount importance.

Unfortunately, it is no longer sufficient to reduce only the density differences between the different regions in the layout during dummy filling. In fact, in some cases, density-based dummy filling could even have a detrimental effect on the final chip topography. Therefore, a need arises for a dummy filling methodology that takes ECP into account.

SUMMARY OF THE INVENTION

State of the art integrated circuits, i.e. 130 nanometer technology and below, currently use copper for interconnect. Electroplating (ECP) and chemical-mechanical polishing (CMP) are key steps in processing the copper layer that can significantly affect the final chip topography. Specifically, the topography of the chip can have systematic variations that are layout pattern dependent and can negatively impact functional and parametric yields. Dummy filling that takes into account the physics of the copper fabrication can result in better planarization, thereby advantageously improving both the functional and parametric yields of a chip.

In accordance with one aspect of the invention, the insertion of dummy features is based on the objective of generating a smooth post-ECP topography. In this technique, a plurality of parameters can be analyzed (also called a multi-parameter technique), wherein the plurality of parameters include at least an effective perimeter per unit area and an effective density. The effective perimeter refers to the edges of the features within that unit area being summed and then convolved with a weighting function. The effective density also refers to the density convolved with a weighting function.

Forming a smooth post-ECP topography can include dividing a layout into tiles, each of which has a predetermined area. In one embodiment, the "case" of each tile can be identified as conformal fill (in which the copper conforms to an underlying trench), over fill (in which the copper is substantially planar), or super fill (in which the copper forms a bump over an underlying trench). In another embodiment, the case of each tile can be identified as conformal fill or a super/over fill (in cases where the ECP model cannot distinguish between the over fill and the super fill cases). A conformal fill tile is associated with large lines in the underlying pattern. An over fill tile is associated with a fine line/fine space underlying pattern. A super fill tile is associated with a fine line/large space pattern.

In the case where the ECP model can identify three cases, at least the super fill tiles can be converted to over fill tiles. Alternatively, both the conformal fill tiles and the super fill tiles can be converted to over fill tiles. In the case wherein the ECP model can identify only two cases, i.e. the conformal and super/over fill tiles, the conformal tiles can be converted to super/over fill tiles. In either case, after conversion, the ECP height difference between tiles can be minimized.

Dummy features can be inserted in the layout to convert tiles to the desired fill tiles and to minimize the height difference between tiles. Advantageously, the steps of dividing the layout into tiles, identifying the tile, converting tiles, minimizing the height differential between tiles, and inserting dummies can be computer implemented using computer instructions. If a tile is identified as a super fill tile, then converting can include inserting a metal dummy feature in the layout. On the other hand, if a tile is identified as a conformal fill tile, then converting can include inserting an oxide dummy feature.

The case of the tile can be identified using a suitably verified ECP model. In one embodiment, the case of each tile can be identified by determining a value of S using the following equation:

$$S = H_0(1-\rho)/[(1-\rho_s)\rho_s] + T\rho/\rho_s - H_0 T_e L_{avg}/\rho_s - H_0/\rho_s$$

wherein $H_0$ is a thickness of copper on a field oxide, $\rho$ is an ECP-effective density, $\rho_s$ is an ECP-effective density after shrinking each layout feature by $\delta_s$, T is a trench depth of the field oxide, $T_e$ is an effective trench depth after expansion, and $L_{avg}$ is an ECP-effective feature perimeter per unit area of the tile (wherein "ECP-effective" refers to a convolution with a weighting function).

If S>0, then that tile is identified as a conformal fill tile. To identify an over fill or super fill tile, a value of $\rho_e$ can be determined, wherein $\rho_e$ is an effective density after expanding each feature in the tile by an expansion amount $\delta_e$. If $\rho_e=1$, then that tile is identified as an over fill tile. Otherwise, the tile is identified as a super fill tile.

At this point, the conformal fill and super fill tiles can be converted to over fill tiles by inserting a minimal number of dummies. Then, the height difference between the various over fill tiles can be minimized. In one embodiment, the height H of a tile in the over fill case is given by the following equation:

$$H = H_0 + H_0\{T_e L_{avg}\} - T\rho$$

wherein $H_0$ is a thickness of copper on a field oxide, $\rho$ is an effective density, T is a trench depth of the field oxide, $T_e$ is an effective trench depth after expansion, and $L_{avg}$ is an effective feature perimeter per unit area of the tile.

The use of smooth post-ECP topography (instead of final chip topography) as one objective during dummy filling enables a computationally efficient model-based dummy filling solution for copper without compromising solution quality. In some embodiments, an additional step of CMP-effective density minimization can further improve planarization.

CMP-effective density minimization can include dividing a layout into tiles, wherein the size of the tiles can be based on a previously used ECP model. In one technique, the priority of each tile can be determined, thereby allowing the tiles to be sorted by such priority. In one embodiment, a high priority tile generally represents a tile having a low CMP-effective density, which can benefit significantly from dummy filling (and thus can significantly reduce the CMP-effective density difference without worsening the height differential between tiles). A maximal independent set containing a tile having the highest priority can be picked first. A maximal independent set refers to tiles that can be modified (i.e. with dummy filling) without affecting each other's height values.

For each selected tile, a density (i.e. less than the slack density or the fillable area) and a perimeter can be picked. Notably, the selected perimeter ensures that the ECP height does not increase (i.e. worsen) beyond the current maximum ECP height of the design. For valid density/perimeter combinations, the corresponding tiles are "locked" and dummy features can be added to the layout. The technique can loop to computing priority of the remaining unlocked tiles. In one embodiment, CMP-effective density minimization can be performed immediately after tile conversion.

Notably, planarization obtained using the multi-parameter technique, CMP-effective density minimization with ECP considerations, or a combined multi-parameter technique with CMP-effective density minimization are significantly better than the planarization provided by conventional density-based solutions (both rule-based solutions and model-based solutions).

In one embodiment, the multi-parameter technique can be modified to take any dummy pattern library as input. This is useful because users can provide dummy fill patterns that exhibit lower capacitive coupling than generic dummy pattern libraries. The multi-parameter technique and the CMP-effective density minimization technique can be easily incorporated into current place and route tools because routing rules are respected during the dummy feature insertion process.

DETAILED DESCRIPTION OF THE FIGURES

Conventional dummy filling techniques focus on placing dummy features to obtain more uniform feature density across the chip, thereby providing better planarization after an inter-layer dielectric (ILD) chemical-mechanical polish (CMP). These density based techniques are adequate when aluminum is used as the interconnect material. However, state of the art integrated circuits (ICs) use copper as the interconnect material and electroplating (ECP) for forming the copper interconnect. Unfortunately, a density-based technique of dummy filling for an IC with copper interconnect could have a detrimental effect on the final chip topography.

In accordance with one aspect of the invention, the layout associated with an IC design can be divided into a plurality of tiles. Tile size can be determined empirically, e.g. by a user or modeler. In general, smaller tile sizes produce higher accuracy and have longer runtimes whereas larger tile sizes produce lower accuracy and have shorter runtimes. Therefore, selecting a tile size (which can be an option in some embodiments) is fundamentally a compromise between accuracy and runtime efficiency. In one embodiment, a tile size of 10 µm×10 µm can result in an acceptable tradeoff between accuracy and runtime.

Figure 4A:
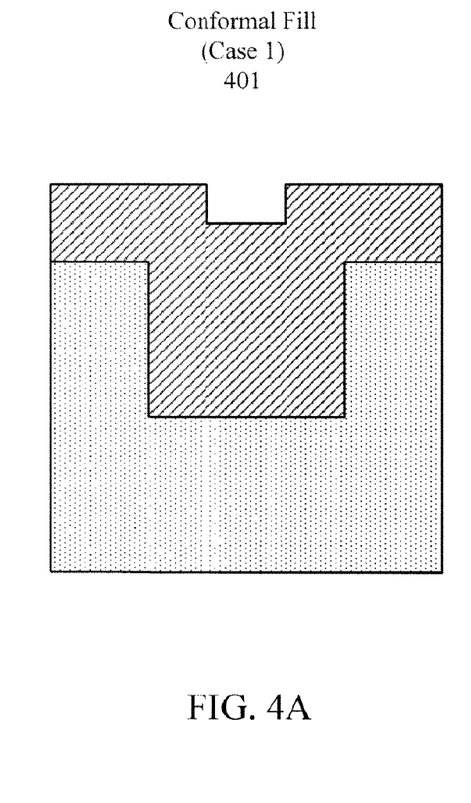
FIGS. 4A-4C illustrate three identifiable copper fill patterns, called cases herein. These cases are conformal fill (case 1), over fill (case 2), and super fill (case 3).
Figure 4B:
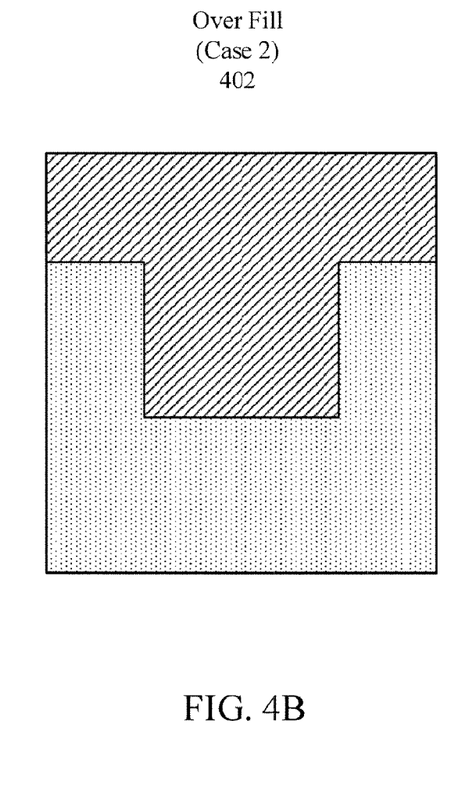
Figure 4C:
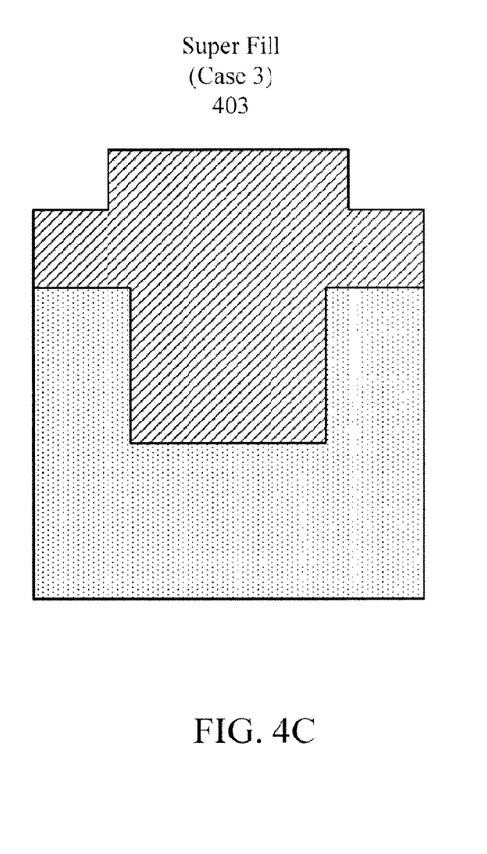

In one embodiment, a tile can include substantially one type of post-ECP topography. FIGS. 4A, 4B, and 4C illustrate three types of post-ECP topography. FIG. 4A illustrates a conformal topography 401 in which the copper layer has a similar profile to that of the underlying etched oxide layer, i.e. the copper layer roughly conforms to trench etched in the oxide layer. A conformal fill topography typically occurs in large lines. FIG. 4B illustrates an over fill topography 402 in which the copper layer is substantially planar irrespective of the underlying etched oxide layer. An over fill topography occurs in fine line/fine space patterns. FIG. 4C illustrates a super fill topography 403 in which the copper layer has an opposite profile to that of the oxide, i.e. a trench in the underlying oxide results in a raised portion (a bump) in the copper. A super fill topography occurs in a fine line/large space pattern.

Note that each topography essentially identities a surface characteristic of the copper layer between lines and spaces of an underlying patterned layer. Thus, referring back to FIG. 3, the surface characteristic between lines and spaces of the fine line/fine space pattern 301 is smooth and therefore corresponds to overfill topography 402 (FIG. 4B). In contrast, the surface characteristic between lines and spaces of the large line/large space pattern 302 and large line/fine space pattern 304 includes dips in the copper and therefore corresponds to conformal fill topography 401 (FIG. 4A). Finally, the surface characteristic between lines and spaces of the fine line/large space pattern 303 includes bumps in the copper and therefore corresponds to super fill topography 403 (FIG. 4C).

In one embodiment, the post-ECP topography of each tile of the layout can be classified as one of the cases shown in FIGS. 4A-4C, wherein conformal fill pattern 401 is called Case 1, over fill pattern 402 is called Case 2, and super fill pattern 403 is called Case 3. Whether a tile is classified as Case 1, Case 2, or Case 3 depends on various layout and process parameters associated with features in that tile. Exemplary layout parameters can include the perimeter (i.e. the summed lengths of all feature edges within a tile), the density after shrinking, and the density after expansion. Exemplary process parameters can include the trench depth, the effective trench depth after expansion, the layout expansion amount $\delta_e$, and the layout shrinking amount $\delta_s$.

For example, equation 1 computes a value "S" for each tile to determine whether that tile is a Case 1.

$$S=H_0(1-\rho)/[(1-\rho_s)\rho_s]+T\rho/\rho_s-H_0T_eL_{avg}/\rho_s-H_0/\rho_s \quad [1]$$

wherein $H_0$ is the thickness of the copper on the field (i.e. above the highest oxide surface), $\rho$ is the ECP-effective density, $\rho_s$ is the ECP-effective density after shrinking each layout feature by $\delta_s$, T is the trench depth of the oxide, $T_e$ is the effective trench depth after expansion, and $L_{avg}$ is the ECP-effective feature perimeter per unit area of the tile (wherein "ECP-effective" refers to a convolution with a weighting function).

Note that features in close proximity to, but not within, a tile can affect the ECP topography of the tile. The ECP-effective density, expansion density, shrink density, and perimeter take this proximity effect into account. To obtain $\rho$, the actual density of the tile is convolved with a weighting function (i.e. a filter function). The filter function is a step function that is equal to $(1/(n*n))$ for a region of size n*n and 0 elsewhere. The value of n equals the length of region over which proximity effects need to be considered divided by size of an individual tile. The remaining ECP-effective parameters are similarly computed. Note that the ECP-effective perimeter can be computed with a value of n that is different from the value used to compute ECP-effective density (because of the different proximity effects based on perimeter).

In one embodiment, proximity effects can be present within 30 microns, thereby resulting in a filter function having a 60 micron diameter. Thus, if tiles are 10 microns×10 microns, then the proximity effects of features within approximately three tiles of the analyzed tile should be included in the ECP-effective density $\rho$. Note that the distance associated with the effective density for CMP is approximately 200 microns to 1 millimeter, which is dramatically more than the distance associated with the effective density for ECP. (Note that the weighting function for computing the CMP-effective density is different and will he discussed later.)

Referring back to equation 1, if S>0, then the tile is classified as a Case 1 tile. If S<0, then the tile could be a Case 2 tile or a Case 3 tile. Distinguishing between Case 2 and Case 3 tiles can be done by checking the value of $\rho_e$, wherein $\rho_e$ refers to the effective density after expanding each feature in the tile by the expansion amount $\delta_e$. In one embodiment, the expansion amount $\delta_e$ can be 750 nanometer. If $\rho_e$=1, then that tile is classified as a Case 2 tile. On the other hand, if $\rho_e \neq 1$, then that tile is classified as a Case 3 tile.

In accordance with one aspect of the invention, the height difference between the different tiles in the layout after ECP can be advantageously minimized. As noted in FIGS. 4A-4C, the height varies with the case type of the tile. To simplify the optimization process, a minimal number of dummy features are inserted into the tiles to ensure all tiles are a selected case. In one embodiment, the selected case is Case 2 because the post-ECP topography within each Case 2 tile is substantially planar unlike the Case 1 and Case 3 tiles that have uneven topographies. After all tiles are Case 2 tiles, the height difference between the tiles is minimized. Note that in some fabrication facilities, the height of a Case 2 tile can be a linear function of density and perimeter and thus can be framed as a linear (i.e. simple) programming problem.

Figure 5:
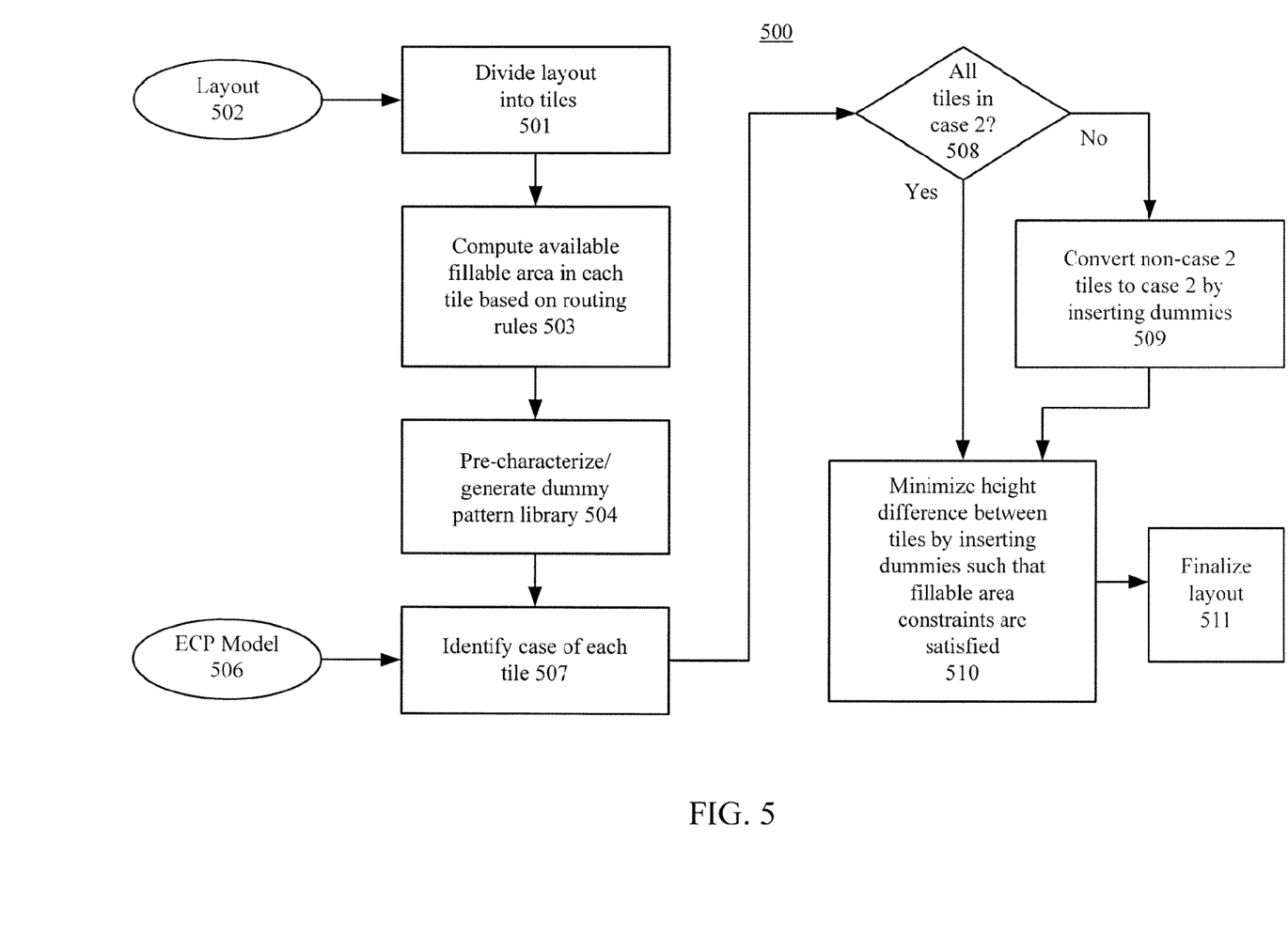
FIG. 5 illustrates a multi-parameter planarization technique using cases 1, 2, and 3 of FIG. 4 to determine appropriate dummy filling.

FIG. 5 illustrates an exemplary flowchart 500 that optimizes post-ECP planarization. In step 501, a layout 502 can be divided in non-overlapping tiles. In one embodiment, tiles can be 10 um×10 um based on the ECP model. In step 503, the available empty region (also referred to as the fill-able area) in each tile can be computed. Note that dummy features can be inserted in this till-able region in accordance with the given routing rules.

In step 504, each pattern in the dummy pattern library can be pre-characterized using the key layout parameters required in the ECP model. The maximum number of elements P_MAX of each pattern that can fit into the largest available fillable area is computed. Then, each instance of the pattern (which is represented by a certain number of elements of the pattern) starting from the smallest instance that has only 1 element of the pattern to the largest instance that has P_MAX number of elements is characterized by its density, shrink density, expansion density and perimeter.

In step 507, using an ECP model 506, each tile can be classified as Case 1, Case 2, or Case 3. If at least one tile is classified as either a Case 1 or Case 3 tile, as determined in step 508, then step 509 converts any such tiles to Case 2 by inserting dummy features. Note that step 509 includes dummy feature insertion and a repetition of steps 507 and 508 until all the tiles in the layout are Case 2. In one embodiment, step 509 can be performed in parallel for a set of tiles of the layout. In that case, because of the ECP-effective density parameter and perimeter (which arc convolved as explained above), each tile in the set of tiles is determined to be functionally non-interacting. That is, the convolving range for each tile in the set of tiles is non-overlapping. In this manner, the dummy filling on one tile will not affect the dummy filling of another tile in the set of tiles. After step 509 or if all tiles are classified as Case 2 tiles, as determined in step 508, then step 510 minimizes the height difference between tiles by inserting dummy features in the layout such that fillable area constraints are satisfied.

Figure 6:
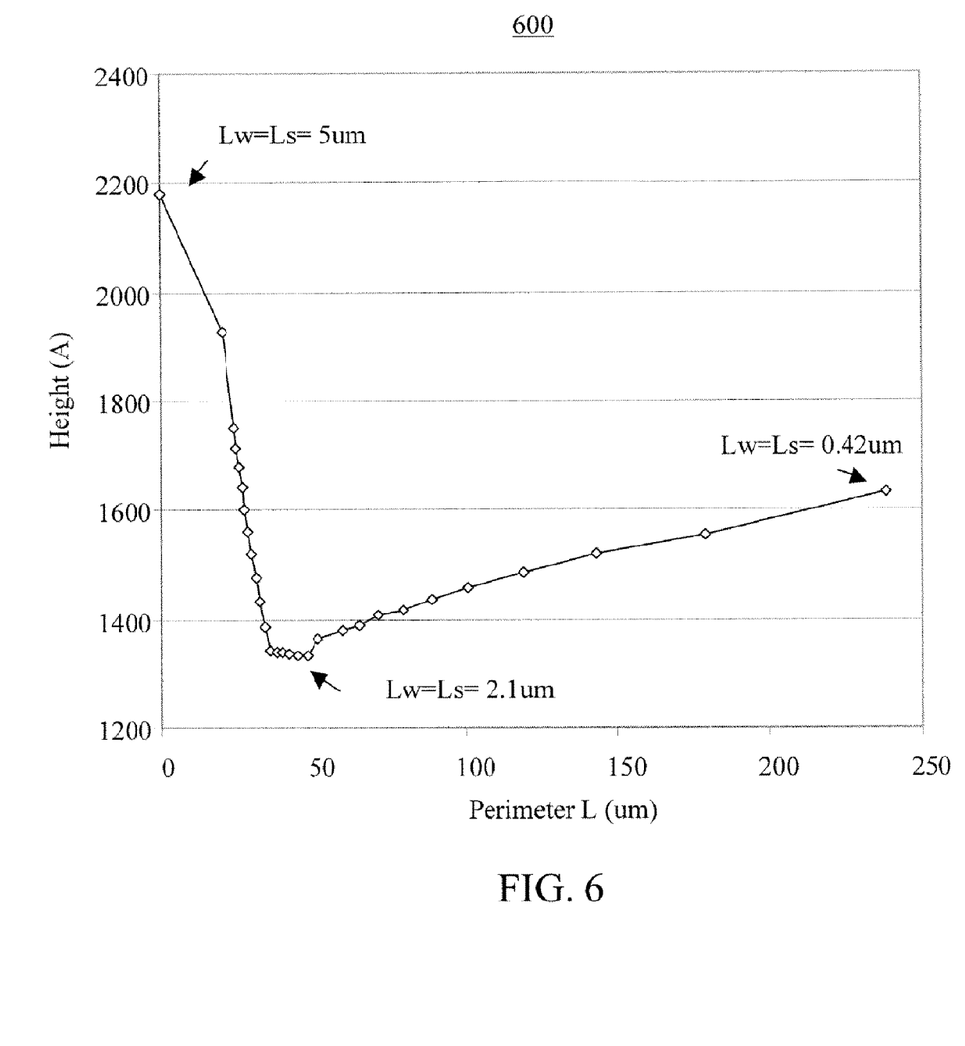
FIG. 6 illustrates an empirically derived chart that plots peak range versus perimeter.

Dummy feature insertion can advantageously affect the density and perimeter parameters, both of which can change the case of the tile as shown in equation 1 (although a tile in Case 2 remains in the same case if the only layout modification allowed is the insertion of metal dummies whose density and perimeter values satisfy the condition for Case 2). Note that for a given density, the height of a tile can vary dramatically based on different perimeter values. FIG. 6 illustrates an empirically derived chart 600 that plots height (i.e. copper height post-CMP)(in angstroms) versus perimeter (in microns).

Note that steps 509 and 510 (FIG. 5) can include metal or oxide (i.e. slot) dummy feature insertion. Specifically, if a tile is Case 3, thereby indicating a fine line/large space pattern, then a dummy feature of metal can be placed between the layout features. To convert a Case 3 tile to a Case 2 tile, $\rho_e$ must be equal to 1, which means that metal features cannot be separated by more than twice the expansion amount in either the horizontal or vertical direction. In one embodiment, dummy features can be placed such that this condition is satisfied. Typically, patterns with the smallest dummy features can be first chosen to ensure that space is available for additional dummy insertion during post-ECP height minimization.

In one embodiment, if a tile is a Case 1 tile, thereby indicating a large line pattern, then a dummy feature of oxide (i.e. a slot) can be placed within the large line. In one embodiment dummy features can be placed between the two oxide edges defining the large line. Typically, patterns in the library with smaller dummy features can be first chosen.

In one embodiment of step 510, a "greedy" iterative algorithm can be used to determine the dummy features to be inserted in each tile such that the height difference between the tiles in the layout is minimized. In one embodiment, the tallest ECP height tile can be used as a maximum height goal and then other tiles can be selected that indicate a high probability of peak-to-peak reduction of the post-ECP heights. These tiles include those whose post-ECP heights are much smaller than the maximum height. The post-ECP height is a function of layout parameters and is given by equation 2:

$$H = H_0 + H_0\{T_e L_{avg}\} - T\rho \qquad [2]$$

In one embodiment, the height of the tile can be checked to ensure that it does not exceed the maximum height goal. Note that after a first tile is adjusted for height, if necessary, then the first tile is "locked" before going to the second tile. In one embodiment, when a second tile having a proximity effect on the first tile is adjusted in height (by adding dummy features), the first tile can he checked to ensure that its post-ECP height is not adversely affected and increased beyond the maximum height. In another embodiment, multiple tiles that are not interacting (because their separation is larger than the distance covered by proximity effects) can be processed at the same time to speed up the algorithm.

In one embodiment, a semi-greedy iterative algorithm can be used, wherein slightly worse results can be temporarily saved and used as the starting point for subsequent iterations. In other words, some isolated changes may negatively impact planarity, but may still be used to improve the planarization quality by enabling height improvement in other tiles. In this case, all dummy filling data, even those associated with the worsened tiles, can be saved.

After all dummy features have been inserted into the layout in steps 509 and 510, then the layout can he finalized in step 511. Thus, steps 509 and 510 can be characterized as the assignment of the dummy features to temporary locations to compute equations 1 and 2, whereas step 511 is an actual placement of the dummy features to provide an optimized planarization of ECP.

In one embodiment, a dummy pattern library can include combinations of different size/shape dummy features and different spacing between such dummy features, thereby creating a plurality of dummy patterns. In one embodiment, each dummy pattern can include a plurality of a predetermined size/shape dummy feature, wherein a maximum size along one dimension of the dummy feature can be a dimension of the tile.

Note that dummy features can be arranged uniformly or non-uniformly to form a pattern, wherein a pattern can have a maximum size of a tile. In one embodiment of a dummy pattern library, several hundred dummy features can be formed into several thousand dummy patterns, wherein each dummy pattern has a specific dummy feature size and a specific dummy spacing between features. Note that the use of a first dummy pattern can be weighted more heavily than a second dummy pattern if the first dummy pattern results in less coupling with signal lines than the second dummy pattern.

In one embodiment, weighting can also be done based on the size of the dummy feature. For example, the smaller the dummy feature the more likely that optical proximity correction (OPC) will be performed on the dummy feature. Because OPC takes valuable system resources, a larger dummy feature can be weighted more heavily than a smaller dummy feature, thereby ensuring that small dummy features are inserted only if they significantly affect planarization quality.

Although illustrative embodiments of the invention have been described in detail herein with reference to the accompanying figures, it is to be understood that the invention is not limited to those precise embodiments. They are not intended to be exhaustive or to limit the invention to the precise forms disclosed. As such, many modifications and variations will be apparent.

For example, in one embodiment, the multi-parameter technique can be applied to an ECP model that distinguishes only two cases, i.e. conformal and super/over fill. In this case, all conformal fill pattern tiles can be converted to the super/over fill pattern tiles. Thus, in step 509 of FIG. 5, non-case 2 can refer to a conformal fill pattern and case 2 can refer to the super/over fill pattern.

In some cases, depending on a particular fabrication process (which can vary from one fab to another), CMP could have more effect on planarization than ECP. In this case, a density-based technique can be used to optimize planarization. In one embodiment, both the multi-parameter technique and the density-based technique can be used in a weighted manner to optimize planarization.

Figure 7:
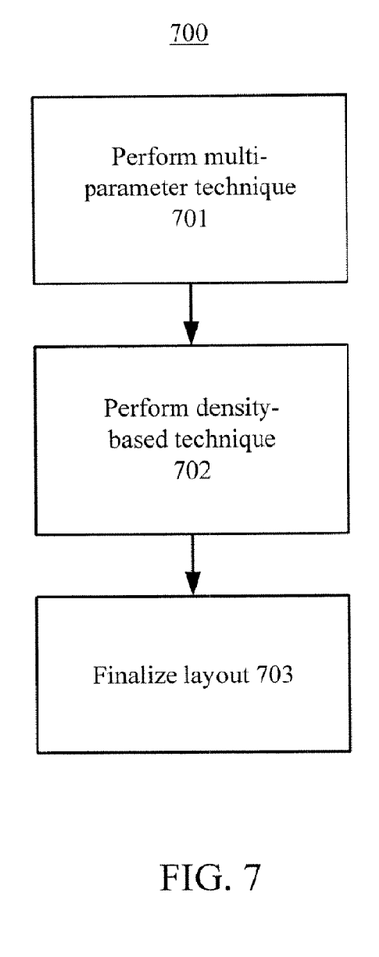
FIG. 7 illustrates an embodiment that first performs the multi-parameter technique and then attempts density uniformity between tiles while ensuring that post-ECP planarization achieved during the multi parameter technique does not worsen.

For example, referring to technique 700 of FIG. 7, priority can be given to the multi-parameter technique by performing the multi-parameter technique first in step 701 and then attempting density uniformity between tiles while ensuring that post-ECP planarization does not worsen in step 702. After both techniques, i.e. the multi parameter and density-based techniques, are performed, then step 703 can finalize the layout.

Figure 8:
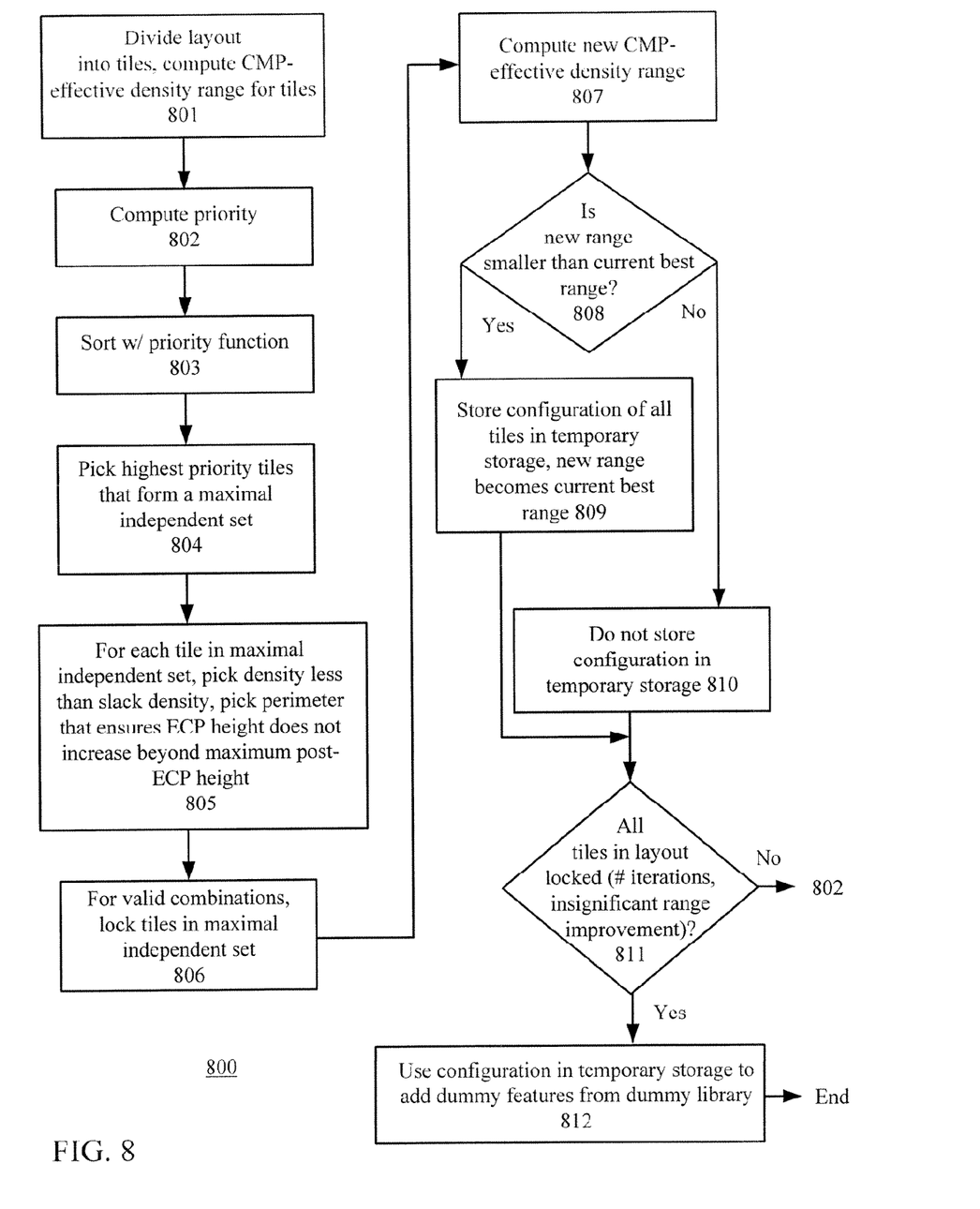
FIG. 8 illustrates an exemplary CMP-effective density minimization technique including ECP considerations.

FIG. 8 illustrates an exemplary CMP-effective density minimization technique 800 that can be used in step 702 as a density-based technique. The CMP-effective density of each tile is calculated by convolving the density of a tile with a weighting function. The weighting function is given as $$w(r) = \frac{4(1-v^2)qa^{\Pi/2}}{\Pi E} \int \sqrt{1 - \frac{r^2 \sin^2\theta}{a^2}} d\theta \quad [3]$$

where "q" is the down pressure, "v" is the Poisson ratio of the polishing pad, "E" is the Young's modulus of the polishing pad, and "a" is the maximum distance at which proximity needs to be considered.

In one embodiment, the CMP-effective density minimization technique 800 can replace step 510 (FIG. 5). In another embodiment, technique 800 can follow step 510. In step 801, the layout is divided into tiles and the CMP-effective density range for all the tiles can be computed. In one embodiment, the tile size can be based on the ECP model used in step 701. Note that the tiles defined by the steps 701 and 702 may or may not be same.

In step 802, the priority of the tiles can be computed. In one embodiment, a priority function can be computed for each tile, wherein the tile(s) having the highest priority for dummy filling can be identified. In one embodiment, tiles having a lower CMP-effective density than a mean CMP-effective density (i.e. the sum of all CMP-effective densities divided by the number of tiles) can be given a high priority. In another embodiment, a target tile surrounded by tiles having a lower CMP-effective density compared to a mean CMP-effective density (wherein the target tile may or may not have a lower CMP-effective density compared to a mean CMP-effective density) can be given the highest priority.

In step 803, the tiles can be sorted based on their priority. In step 804, the highest priority tiles that form a maximal independent set can be selected for dummy filling. The maximal independent set refers to tiles that have separate zones of influence when dummy filling. The zone of influence refers to the region around a tile where dummy filling that tile can affect tiles in this region. Therefore, the maximal independent set refers to the set of tiles that can be modified without affecting each other. In one embodiment, 10-20 tiles can be included in the maximal independent set. Note that building the maximal independent set can advantageously reduce runtime because multiple tiles can be filled (described below) at the same time.

Step 805 can pick, for each tile in the maximal independent set, a density less than an available slack density (i.e. the fillable area/total area). Notably, step 805 can also pick a perimeter (e.g. using the dummy fill library) that ensures the post-ECP height of the tile and the tiles in its ECP zone of influence do not increase beyond the maximum post-ECP height of the original design. Therefore, effective density minimization can advantageously take ECP considerations into account in step 805.

In step 806, the tiles in the maximal independent set having valid density/perimeter combinations are locked. Note that the features and the density/perimeter combination of the locked tiles are not changed in subsequent steps. In step 807, a new CMP-effective density range can be computed. If the new range is smaller than the current best range, as determined in step 808, the current configuration of all of the tiles can be stored in temporary storage and the new range can be designated the current best range. If, in step 808, the new range is not smaller than the current best range, then the current configuration is not stored in temporary storage. Following either step 809 or step 810, step 811 can check if all the tiles in the layout are locked. If not, then the process can return to step 802 to compute new priorities. Otherwise, the configuration stored in temporary storage can be used to add dummy features from a dummy fill library in step 812. These dummy features can be those that best match the density/perimeter combination of each tile. Note that the dummy pattern selected can be aligned to the routing grid, the manufacturing grid, or a multiple of the manufacturing grid.

Note that in another embodiment, step 811 can check for the number of iterations, i.e. the number of times that the process loops back to step 802, compared to a predetermined number. If the number of iterations is less than that predetermined number, then the process returns to step 802. In yet another embodiment, step 811 can check for insignificant improvement in to the CMP-effective density range. For example, if the current best range has not improved by a predetermined amount (e.g. a significant improvement), then the process may proceed to step 812 rather than return to step 802. Note that in one embodiment, steps 807-810 are optional steps.

Accordingly, it is intended that the scope of the invention be defined by the following Claims and their equivalents.

The invention claimed is:

1. A method of forming a planar post chemical-mechanical polish (post-CMP) topography, the method comprising:
   forming a post-electroplating (post-ECP) topography using a plurality of parameters, wherein the plurality of parameters include at least an effective perimeter per unit area and an effective density.

2. The method of claim 1, wherein forming the post-ECP topography includes:
   dividing a layout into a plurality of tiles;
   identifying a case of each tile, wherein the case is one of conformal fill, over fill, and super fill;
   converting at least any super fill tiles to over fill tiles; and then
   minimizing a height difference between tiles.

3. The method of claim 1, wherein forming the post-ECP topography includes:
   dividing a layout into a plurality of tiles;
   identifying a case of each tile, wherein the case is one of conformal fill and super/over fill;
   converting any conformal fill tiles to super/over fill tiles; and then
   minimizing a height difference between tiles.

4. The method of claim 2 or 3, wherein the converting and the minimizing include inserting dummy features in the layout.

5. The method of claim 2, wherein if a tile is identified as a super fill tile, then converting includes inserting a metal dummy feature in the layout.

6. The method of claim 2 or 3, wherein if a tile is identified as a conformal fill tile, then converting includes inserting an oxide dummy feature in the layout.

7. The method of claim 2 or 3, wherein identifying the case of each tile includes determining a value of S, wherein $$S=H_0(1-\rho)/[(1-\rho_s)\rho_s]+T\rho/\rho_s-H_0 T_e L_{avg}/\rho_s-H_0/\rho_s$$

wherein $H_0$ is a thickness of copper on a field oxide, $\rho$ is an ECP-effective density, $\rho_s$ is an ECP-effective density after shrinking each layout feature by $\delta_s$, T is a trench depth of the field oxide, $T_e$ is an effective trench depth after expansion, and $L_{avg}$ is an ECP-effective feature perimeter per unit area of the tile, wherein ECP-effective refers to a convolution with a weighting function.

8. The method of claim 7, wherein if S>0, then that tile is identified as a conformal fill tile.

9. The method of claim 2, wherein identifying the case of each tile includes determining a value of $\rho_e$, wherein $\rho_e$ is an ECP-effective density after expanding each feature in the tile by an expansion amount $\delta_e$.

10. The method of claim 9, wherein if $\rho_e=1$, then that tile is identified as an over fill tile.

11. The method of claim 9, wherein if $\rho_e \neq 1$, then that tile is identified as a super fill tile.

12. The method of claim 2 or 3, wherein minimizing the height difference between tiles includes determining a height H of a tile using $$H=H_0+H_0\{T_e L_{avg}\}-T\rho$$

wherein $H_0$ is a thickness of copper on a field oxide, $\rho$ is an ECP-effective density, T is a trench depth of the field oxide, $T_e$ is an effective trench depth after expansion, and $L_{avg}$ is an effective feature perimeter per unit area of the tile.

13. The method of claim 2 or 3, wherein minimizing the height difference between tiles includes:
   prioritizing each tile based on CMP-effective density, wherein a low CMP-effective density corresponds to a high priority;
   sorting the tiles by the prioritizing;
   selecting a set of high priority tiles that form a maximal independent set;
   for each selected tile in the maximal independent set, selecting a density and a perimeter that does not increase a post-ECP height of the tile and other tiles in an ECP zone of influence beyond a predetermined height; and
   locking all processed tiles.

14. The method of claim 13, wherein minimizing CMP-effective density range includes adding dummy features in the layout.

15. The method of claim 2 or 3, wherein the steps of dividing, identifying, converting, and minimizing are implemented using computer instructions embodied on a computer-readable medium.

16. A method of performing CMP-effective density minimization for a layout, the method comprising:
   (a) receiving a plurality of tiles that form the layout, the plurality of tiles being sized based on an electroplating (ECP) model;
   (b) prioritizing each tile based on CMP-effective density, wherein a low CMP-effective density corresponds to a high priority;
   (c) sorting the plurality of tiles by the prioritizing;
   (d) selecting a set of high priority tiles forming a maximal independent set;
   (e) for each selected tile in the maximal independent set, selecting a density and a perimeter that does not increase a post-ECP height of the tile and other tiles in an ECP zone of influence beyond a predetermined height; and
   (f) for each valid density/perimeter combination, locking that tile.

17. The method of claim 16, wherein the density is less than a slack density.

18. The method of claim 16, further including dividing the layout into the plurality of tiles.

19. The method of claim 16, further including, for each locked tile, adding dummy features from a dummy fill library that closely match the valid density/perimeter combination.

20. The method of claim 19, further including:
   repeating steps (b)-(f), wherein step (b) excludes any locked tiles.

21. The method of claim 16, wherein steps (a)-(f) are implemented using computer instructions embodied on a computer-readable medium.

22. A computer-implemented method of forming a planar post-CMP topography, the computer-implemented method comprising a plurality of instructions on a computer-readable medium, the instructions comprising:
   instructions for dividing a layout into a plurality of tiles;
   instructions for identifying a case of each tile, wherein the case is one of conformal fill, over fill, super fill, and over/super fill;
   if over fill and super fill are available cases, then instructions for converting at least any super fill tiles to over fill tiles;

if over/super fill is an available case, then instructions for converting any conformal fill tiles to over/super fill tiles; and instructions for minimizing a height difference between tiles.

23. The computer-implemented method of claim 22, wherein the instructions for converting and the instructions for minimizing include instructions for inserting dummy features in the layout.

24. The computer-implemented method of claim 22, wherein the instruction for minimizing the height difference between tiles includes a CMP-effective density range minimization with ECP considerations.

25. The computer-implemented method of claim 24, wherein the effective density minimization includes:
(a) receiving a plurality of tiles that form the layout, the plurality of tiles being sized based on an electroplating (ECP) model;
(b) prioritizing each tile based on CMP-effective density, wherein a low CMP-effective density corresponds to a high priority;
(c) sorting the plurality of tiles by the prioritizing;
(d) selecting a set of high priority tiles that form a maximal independent set;
(e) for each selected tile in the maximal independent set, selecting a density and a perimeter that does not increase a post-ECP height of the tile and other tiles in an ECP zone of influence beyond a predetermined height; and
(f) for each valid density/perimeter combination, adding corresponding dummy features to the layout.

26. The computer-implemented method of claim 25, wherein the density is less than a slack density.

27. The computer-implemented method of claim 25, further including dividing the layout into the plurality of tiles.

28. The computer-implemented method of claim 25, wherein step (f) further includes for each valid density/perimeter combination, locking the tile.

29. The computer-implemented method of claim 28, further including:
repeating steps (b)-(f), wherein step (b) excludes any locked tiles.

* * * * *